United States Patent [19]
Watkins et al.

[11] Patent Number: 5,405,181
[45] Date of Patent: Apr. 11, 1995

[54] SAFETY DEVICE

[76] Inventors: John V. Watkins, 3431 Roxton St., Port Coquitlam B.C., Canada, V3B 5L6; Theodore R. Moul, #107-2010 St. John's St., Port Moody B.C., Canada, V3H 2A2

[21] Appl. No.: 44,525

[22] Filed: Apr. 8, 1993

[51] Int. Cl.⁶ .............................................. B60P 1/04
[52] U.S. Cl. .................................................. 298/17 B
[58] Field of Search ................. 298/17 B, 19 B, 22 B

[56] References Cited

U.S. PATENT DOCUMENTS

| | | |
|---|---|---|
| 1,670,232 | 5/1928 | Biszantz . |
| 2,407,012 | 9/1946 | Hutchinson . |
| 3,813,124 | 5/1974 | Roland ........................ 298/17 B |
| 4,305,619 | 12/1981 | Sas ............................. 298/17 B |
| 4,355,944 | 10/1982 | Lorence . |
| 4,480,871 | 11/1984 | Fox ............................. 298/22 J |
| 4,779,931 | 10/1988 | Miller et al. ................. 298/17 B |
| 4,917,557 | 4/1990 | Kato et al. ................. 298/17 B X |

FOREIGN PATENT DOCUMENTS

| | | | |
|---|---|---|---|
| 55-47927 | 4/1980 | Japan ........................... | 298/17 B |
| 183325 | 10/1983 | Japan ........................... | 298/17 B |

Primary Examiner—Michael S. Huppert
Assistant Examiner—Janice L. Krizek
Attorney, Agent, or Firm—Townsend and Townsend Khourie and Crew

[57] ABSTRACT

A safety apparatus to be mounted on a chassis of a dump vehicle having a dump back movable between a rest position and a dump position. The safety apparatus has a guide member attached to the vehicle chassis to define a closed track. There is a safety prop pivotally attached to the dump back. At the bottom of the safety prop a wheel or the like is attached and is received by and engages the guide member. There is a locking member to retain the safety prop and thus the dump back in a fixed position relative to the guide member when the back is raised to the dump position. The locking member acts to prevent downward movement of the back.

13 Claims, 2 Drawing Sheets

SAFETY DEVICE

FIELD OF THE INVENTION

This invention relates to a safety device to be mounted on the chassis of a dump vehicle. In this present specification a dump vehicle is any vehicle, whether a dump truck, trailer or other similar vehicle, having a dump body movable between a rest position and a dump position.

DESCRIPTION OF THE PRIOR ART

Dump vehicles are well known. When a vehicle is required to carry loose material that is not fragile or when there is no concern if the material carried is damaged in any way, a dump vehicle is the ideal way of carrying it. It can be loaded easily by filling up the large dump body of the vehicle and emptied by tipping the dump body by extending a hydraulic ram. In a dump truck a power take off from the engine can be used to drive a hydraulic pump to operate the ram. In a dump trailer the power take off may be from the towing vehicle. Some dump vehicles use entirely mechanical means for tipping the dump body.

When the vehicle is being serviced it is desirable to brace the raised dump body to maintain it in the raised position. In a very large number of cases this is done by simply jamming a prop between the vehicle chassis and the raised dump body. This is inconvenient and undesirable. The prop can break or slip from position. There have been serious injuries and death when a dump body has fallen on a workman who happened to be underneath the raised dump body.

As indicated, the most common safety device is a prop between the vehicle chassis and the dump body, but there have been a number of suggestions in the patent literature to improve the safety.

Prior art known to applicants includes the following United States patents:

U.S. Pat. No. 2,407,012 to Hutchinson: U.S. Pat. No. 4,355,944 to Lorenc: U.S. Pat. No. 4,779,931 to Miller: U.S. Pat. No. 4,305,619 to Sas: U.S. Pat. No. 3,813,124 to Roland: U.S. Pat. No. 1,670,232 to Biszantz and U.S. Pat. No. 4,480,871 to Fox.

Of these patents Hutchinson uses a ratchet and pawl mechanism that automatically engages. The pawl is released upon lowering or raising the dump body.

Lorenc teaches the use of a simple pin to go under the lift arm in a loader boom.

Miller teaches a safety support and stop assembly having an upright support member, a cradle support assembly and a base assembly. The upright support member has an upper bed-engaging support and a lower pivot end. This lower pivot end is pivotally connected to the cradle support assembly.

Sas teaches a prop assembly including an elongated prop leg with one end pivotally mounted to the vehicle dump bed.

Roland teaches a prop pivotally mounted to the dump body that engages temporarily in a recess on the chassis.

Biszantz teaches an arrangement of levers and provides a dump body that can tilt and shift longitudinally during dumping.

Fox teaches stabilization of a dump truck, and is principally concerned to avoid twisting of the dump body relative to the main frame.

Despite the above, a simple prop is still the most common way of attempting to secure a dump body, evidence of the general lack of acceptance of previous suggestions.

The present invention therefore seeks to provide a simple mechanism that, in the main, moves automatically with the raising or lowering of the dump body of a dump truck. Operator intervention is required only to move a simple device to a safe position, in which the dump body is locked, from a storage position, in which the device is stored when not in use.

SUMMARY OF THE INVENTION

Accordingly, and in its broadest aspect, the present invention provides a safety apparatus to be mounted on a chassis of a dump vehicle having a dump body movable between a rest position and a dump position, the safety apparatus comprising a guide member attached to the vehicle chassis to define a closed track; a safety prop pivotally attached to the dump body; means attached to the safety prop to be received by and engage the guide member, a locking member to retain the safety prop, and thus the dump body, in a fixed position relative to the guide member when the dump body is raised to the dump position, the locking member thus acting to prevent downward movement of the dump back.

DESCRIPTION OF THE PREFERRED EMBODIMENTS

Figure 1:
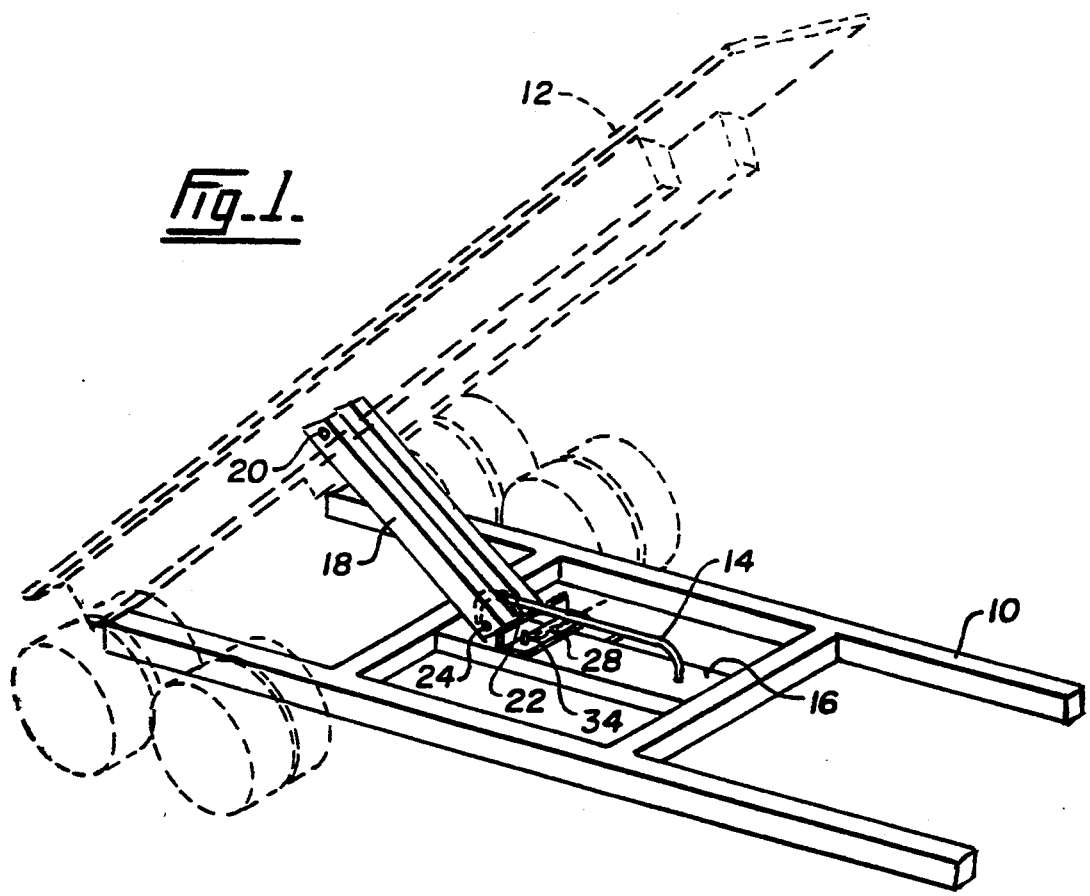
FIG. 1 is a diagrammatic view showing a first embodiment of the present invention.

The drawings show a safety apparatus to be mounted on the chassis 10 of a dump vehicle having a dump body 12 (FIG. 1) movable between a rest position and a dump position. Only general details of the components of the truck and of the dump body are shown. These are conventional, prior art components. The dump position is shown in FIG. 1. Usually the dump body 12 is moved to that position by the operation of a hydraulic ram (not shown) mounted on the chassis 10.

The safety apparatus of the invention has a guide member 14 attached to the vehicle chassis 10 to define a closed track. In the illustrated embodiment the guide member 14 is mounted on a longitudinal member 16 which will be added to the chassis 10 by, for example, bolting. In the illustrated, preferred embodiment, the guide member 14 is a generally U-shaped member.

There is a safety prop 18 pivotally attached to the body 12 at 20. In the illustrated embodiments the safety prop 18 comprises spaced apart members pivoted to the dump body 12. There are means attached to the safety prop 18 to be received by and to engage the guide member 14. In the illustrated embodiments the means comprises a wheel 22 and there is an axle 24 between the spaced members of the prop 18 to mount the wheel 22. The wheel 22 has a peripheral groove 26 to engage the guide member 14, which is of circular cross-section.

Figure 2:
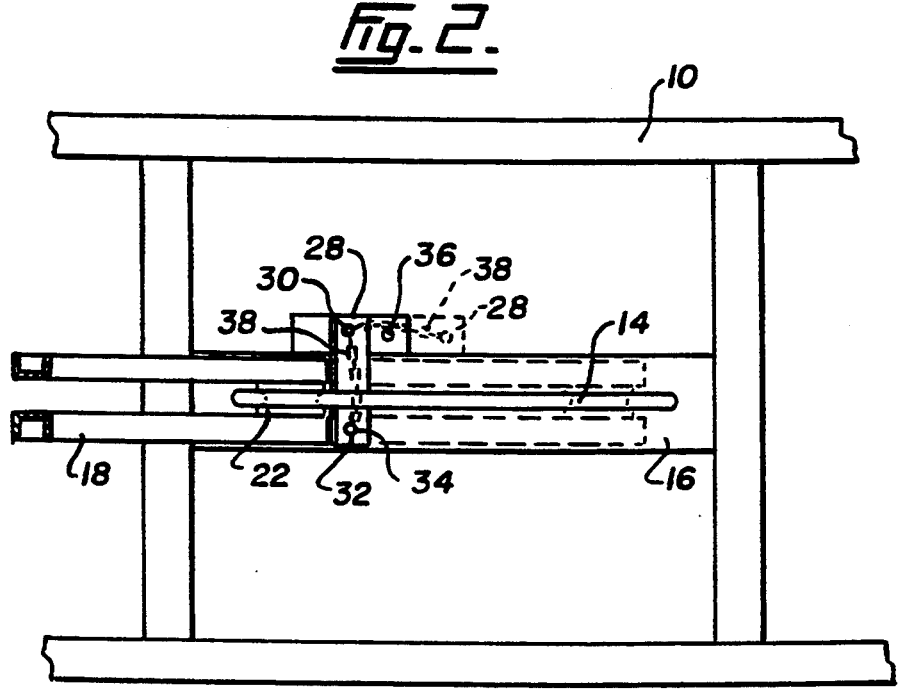
FIG. 2 is a plan view of the safety device shown in FIG. 1.

There is a locking member to retain the beam 18, and thus the dump body 12, in a fixed position relative to the guide member 14, when the body 12 is raised to the dump position, as shown in FIG. 1. The locking member thus acts to prevent downward movement of the back. As shown in FIGS. 1 and 2 the locking member is a simple angle bar 28 pivotally attached to the longitudinal member 16 at 30 and pivotal between a storage position, as shown in broken lines in FIG. 2, generally parallel to the guide member 14, and a safe position in which it extends transversely of the guide member 14 and contacts the wheel 22 at the base of the safety prop 18 to prevent movement of wheel 22. The angle bar 28 is formed with an opening 32 and there is a further opening in the longitudinal member 16. The further opening is not shown in FIG. 2 as it is below angle bar 28 but the opening aligns with the opening 32 in the angle bar 28. A pin 34 can then be inserted through the aligned openings to ensure that the angle bar 28 remains in the transverse position shown in FIG. 2.

There is a second opening 36 in the longitudinal member 16 so that the angle bar 28 can be locked in the stored position. The pin 34 is attached to the angle bar 28 by a chain 38.

To use the invention as shown in FIGS. 1 and 2 first the angle bar 28 is maintained in the stored position when the dump body 12 is down. The angle bar 28 may be maintained in this position by inserting the pin 34 through the openings 32 and 36 in angle bar 28 and longitudinal member 16 respectively.

When the dump body 12 is raised, using a hydraulic ram or the like, it is simply necessary to maintain pressure to the hydraulic ram while a workman leans across the chassis, beneath the raised body 12, removes the pin 34 from openings 32 and 36, pivots the angle bar 28 to the position shown in FIG. 2 and inserts the pin 34 into opening 32 and the opening in the longitudinal member 16 now aligned with opening 32. Bar 28 is now locked in a position transverse to guide member 14. The body 12 is securely located, without risk of movement.

When it is desired to lower the body 12 the above procedure is reversed. Pressure is maintained to the hydraulic ram while the workman leans across the chassis, beneath the raised body 12, removes the pin 34 from the opening 32 and pivots the angle bar 28 to the position perpendicular to the position shown in FIG. 2, that is to a position generally parallel to the guide member 14. The pin 34 may then be inserted through the aligned openings 32 and 36 to secure the angle bar 28. Body 12 may then be lowered.

Figure 3:
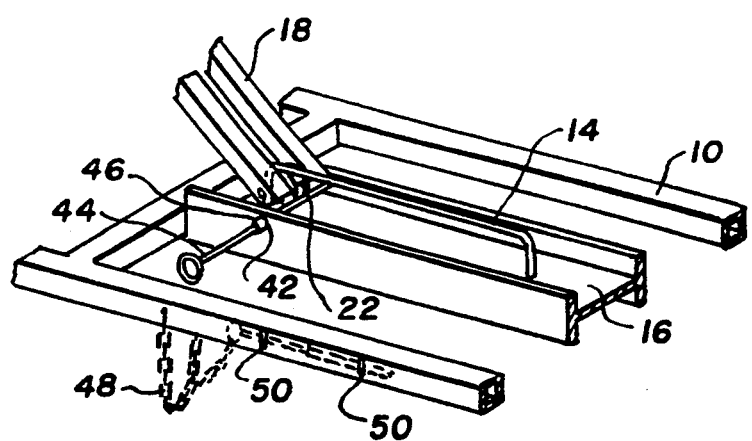
FIG. 3 is an isometric view of a detail of a further embodiment of the invention.
Figure 4:
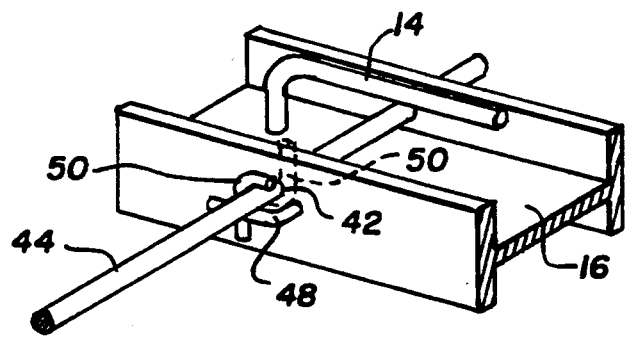
FIG. 4 is a detail showing a variation of the embodiment of FIG. 3.

The embodiment of FIGS. 3 and 4 differs in the locking member. In FIG. 3, longitudinal member 16 is of H-section and there are openings 42 formed in opposed walls of the H. An elongated pin 44, having a projection 46, extends through these openings 42. The pin has a chain 48 so that it can be stored by clips 50, as shown in FIG. 3, where pin 44, when stored, is shown in broken lines. With this embodiment a workman need not lean under the body to position the locking member. Once the dump body 12 is raised, the workman unclips the pin 44 from the side chassis member and inserts it through the aligned openings 42 until the projection 46 contacts the side wall of longitudinal member 16. The vehicle is then safe.

FIG. 4 shows a simple means for securing the elongated pin 44 in position. There is an L-shaped bracket 48 attached to the longitudinal member 16, for example by welding. A stud 50 is attached to the elongated pin 44. Stud 50 also acts instead of the projection 46 shown in FIG. 3. Using the arrangement shown in FIG. 4 the elongated pin 44 is inserted into position in the openings 42 in the longitudinal member 16 with the stud 50 raised, that is in the position shown in broken lines in FIG. 4. The depth of insertion is controlled by the stud 50 hitting the outside of the wall of the longitudinal member 16. Elongated pin 44 is then rotated to the position shown in solid lines in FIG. 4, that is the stud 50 engages bracket 48 to secure the elongated pin 44 in position. In removing the elongated pin 44 to allow the dump body to be returned to the rest position, the pin 44 is rotated and may then be pulled from the longitudinal member 16. In FIG. 4 details such as the prop 18 and the wheel 22 are omitted for clarity.

The present invention thus provides a simple device to ensure that a dump truck body will not fall due to hydraulic failure of the lifting mechanism or for any other reason. The device is simple to operate. The safety device is in fact actuated simply by lifting the dump body when the pivotal prop automatically trails the raised body. It is simply necessary to place a locking member in position, an activity that takes a few seconds.

In addition, the apparatus of the present invention provides a simple apparatus to prevent over-tipping. A common procedure in dumping loads is to raise the dump body, reverse the dump truck, then apply the brakes, thus ensuring complete dumping of the load. This can result in the dump body over-tipping, causing damage and serious hazards. To prevent this most dump bodies are linked to the main chassis by means of a stout cable that limits the height and angle to which the dump body can be raised. With the invention over-tipping is prevented by the wheel 22 being trapped within the guide member 14. A separate protection against over-tipping is not required. Furthermore, the locking member aspect of the present invention is not required in order to prevent overtipping, although it must be considered essential in preventing downward movement of the dump back when that dump back is in the dump position, that is raised by the hydraulic ram or the like.

Variations of the illustrated embodiments are possible. For example the drawings show a wheel 22 engaging a guide member 14 of circular cross-section. However member 14 clearly need not be of circular section and the wheel 22 may be replaced by a simple roller. The wheel 22 may be replaced by a simple axle that cannot rotate but simply contacts the guide 14. However rotation is preferred to facilitate operation.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. A safety apparatus mounted on a chassis of a dump vehicle having a dump back movable between a rest position and a dump position, the safety apparatus comprising:

a guide member attached to the vehicle chassis to define a closed track having a base, a top and front and rear ends linking the top and the base;

a safety prop pivotally attached to the dump back;

a guide member follower attached to the safety prop to be received by, and engage, the guide member, said follower being disposed within said guide member and movable within said guide member along the longitudinal extent of the closed track, said front and rear ends of the closed track acting as stops to restrict the longitudinal movement of the follower along the closed track, the follower being in contact with the rear end of the closed track when the dump back is in the dump position;

a locking member movable to a safe position across the guide member adjacent the rear end of the closed track, and trapping the follower against the rear end of the closed track to prevent forward movement of the follower and thus downward movement of the dump back.

2. Apparatus as claimed in claim 1 in which the guide member follower is a rotatable wheel movable along the guide member.

3. Apparatus as claimed in claim 1 in which the base of the guide member is a longitudinal member attached to the vehicle chassis.

4. Apparatus as claimed in claim 1 in which at least the top, and the front and rear ends of the guide member are of circular cross-section.

5. Apparatus as claimed in claim 2 in which the safety prop comprises spaced members pivotally attached to the dump back; and an axle between the spaced members to mount the wheel.

6. Apparatus as claimed in claim 5 in which the wheel has a peripheral groove to engage the guide member.

7. Apparatus as claimed in claim 1 in which the locking member is a member pivotally attached to the chassis and pivotal between a storage position, generally parallel to the guide member, and a safe position, extending transverse to the guide member.

8. Apparatus as claimed in claim 7 including means to lock the locking member in the safe position.

9. Apparatus as claimed in claim 8 including a pin that can extend through an opening in the locking member and through an opening in the chassis to lock the locking member in the safe position.

10. Apparatus as claimed in claim 1 in which the locking member is a pin able to extend through openings in the chassis to lock the safety prop.

11. Apparatus as claimed in claim 10 including means to attach the pin to the chassis for storage.

12. Apparatus as claimed in claim 10 including means to secure the pin in position in the openings in the chassis.

13. Apparatus as claimed in claim 12 in which the means to secure the pin comprises a bracket attached to the vehicle chassis; and a stud attached to the pin to be received in the bracket to secure the pin.

* * * * *